T. J. MUMFORD, 2D & H. W. SINCLAIR.
METHOD OF MAKING CHAINS.
APPLICATION FILED JAN. 16, 1918.

1,262,613.

Patented Apr. 9, 1918.
4 SHEETS—SHEET 1.

WITNESS:

INVENTORS

BY

ATTORNEYS

T. J. MUMFORD, 2D & H. W. SINCLAIR.
METHOD OF MAKING CHAINS.
APPLICATION FILED JAN. 16, 1918.

1,262,613.

Patented Apr. 9, 1918.
4 SHEETS—SHEET 2.

WITNESS:

INVENTORS

BY

ATTORNEYS.

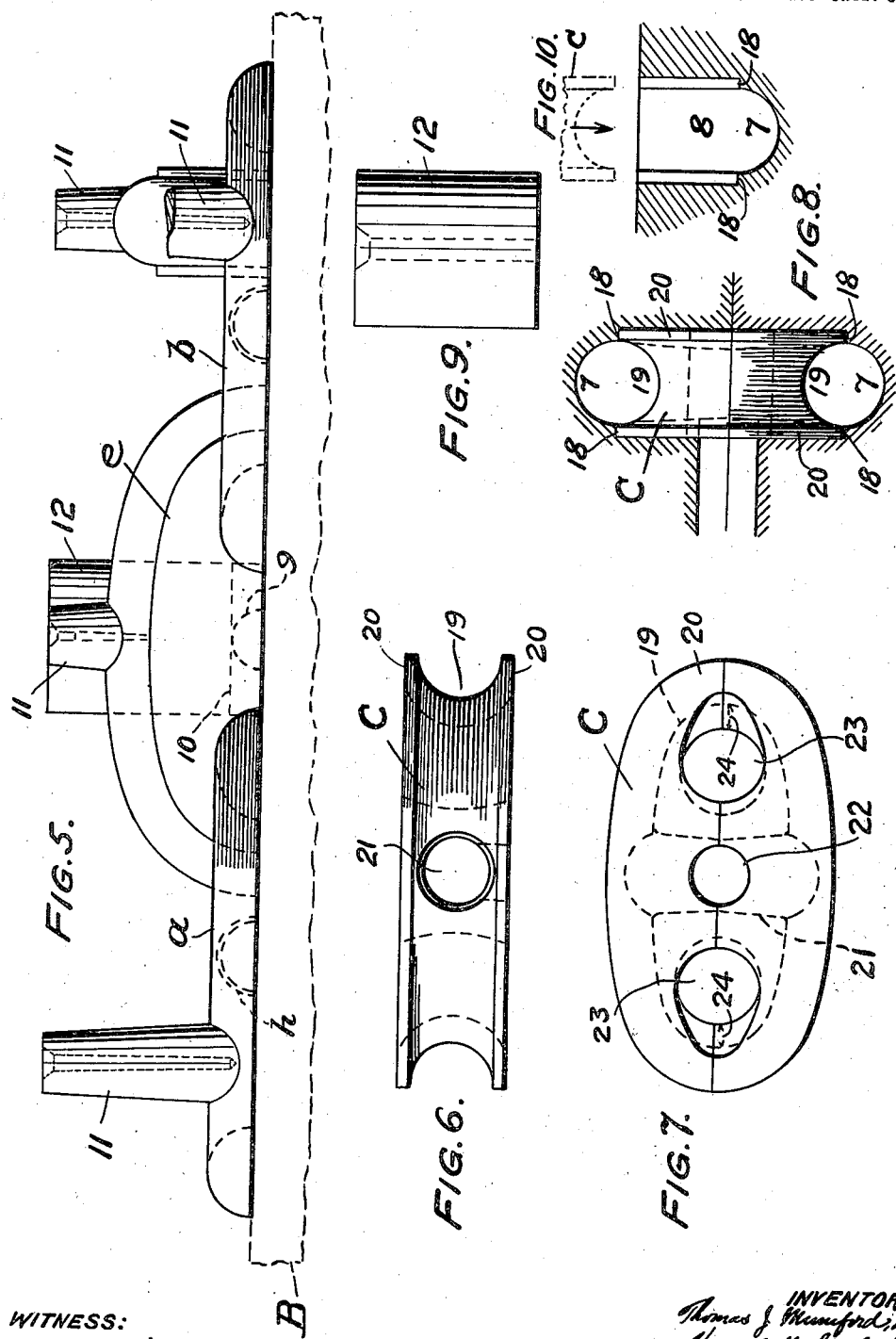

T. J. MUMFORD, 2D & H. W. SINCLAIR.
METHOD OF MAKING CHAINS.
APPLICATION FILED JAN. 16, 1918.

1,262,613.

Patented Apr. 9, 1918.
4 SHEETS—SHEET 4.

UNITED STATES PATENT OFFICE.

THOMAS J. MUMFORD, 2D, OF PLAINFIELD, AND HOWARD W. SINCLAIR, OF ELIZABETH, NEW JERSEY.

METHOD OF MAKING CHAINS.

1,262,613. Specification of Letters Patent. Patented Apr. 9, 1918.

Application filed January 16, 1918. Serial No. 212,055.

*To all whom it may concern:*

Be it known that we, THOMAS J. MUMFORD, 2d, of Plainfield, county of Union, and State of New Jersey, and HOWARD W. SINCLAIR, of Elizabeth, county of Union, and State of New Jersey, have invented certain new and useful Improvements in Methods of Making Chains, of which the following is a specification.

This invention relates to method of and apparatus for making cast chain, and it has for one of its primary objects the provision of a novel and improved method whereby it is possible to economically and expeditiously cast chain of uniform size, strength, and weight in a sand mold, and even in a green sand mold. An additional object of our invention resides in a method whereby it is possible to cast such a chain in a sand mold with the studs integral. Another object of the invention resides in the provision of a method of the character described by means of which it is possible to make the molds on conventional molding machinery from split and half patterns.

Our improved method will be best understood from a description of the preferred form of apparatus employed, one embodiment of such apparatus being shown in the accompanying drawings, wherein—

Figure 1:
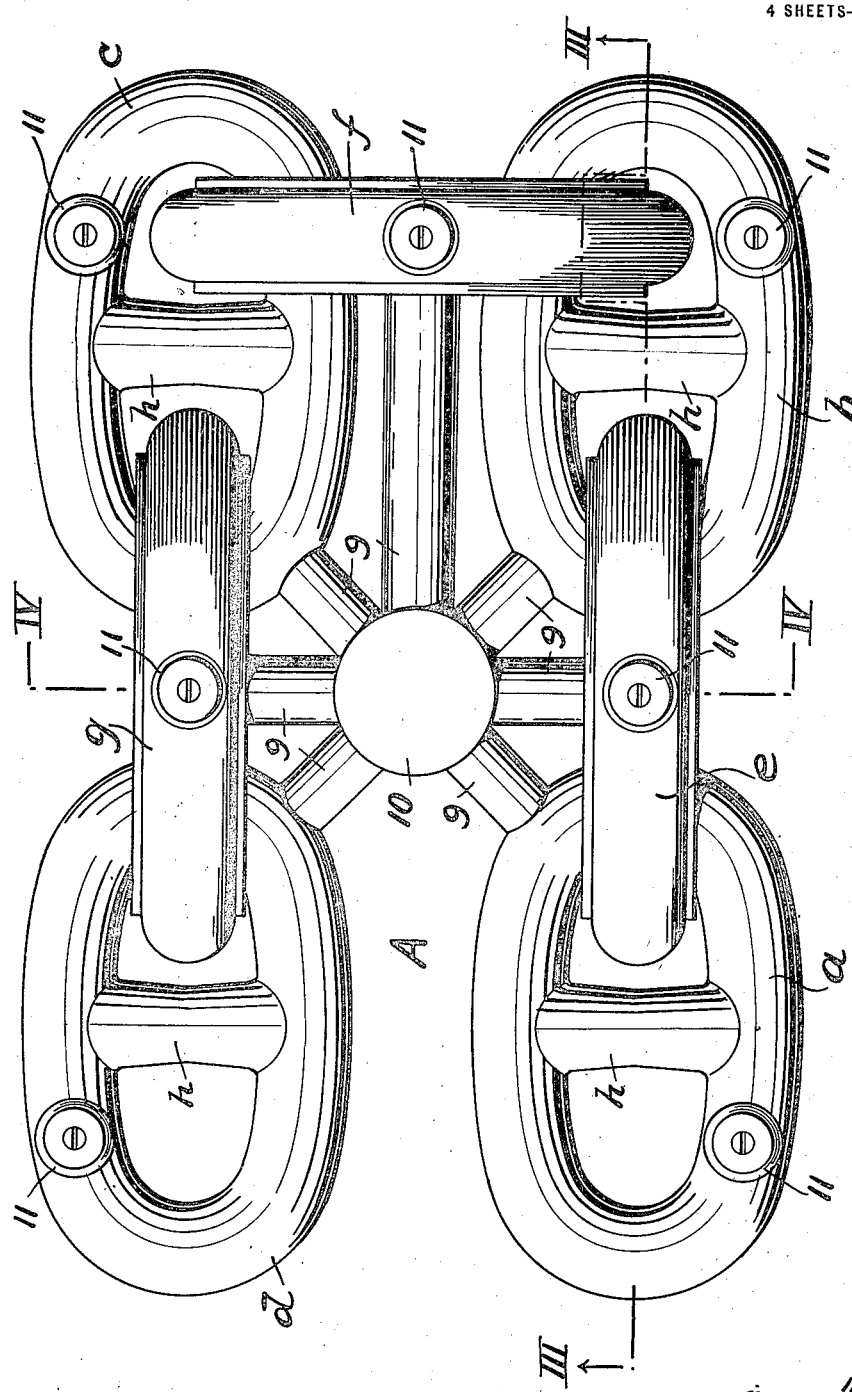
Figure 3:
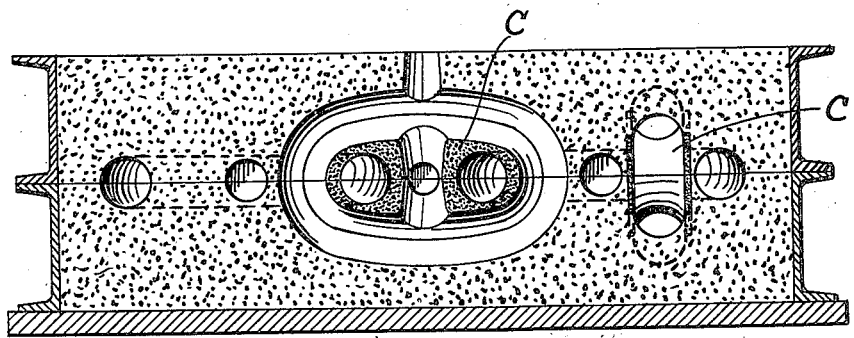
Figure 4:
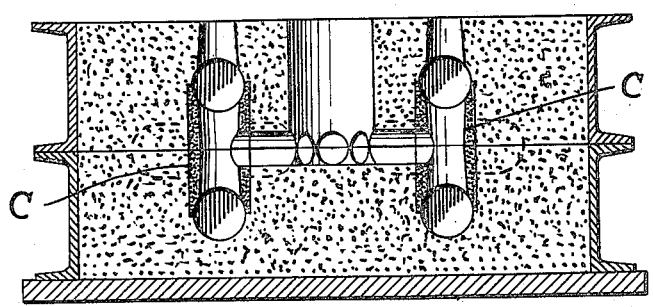
Figure 2:
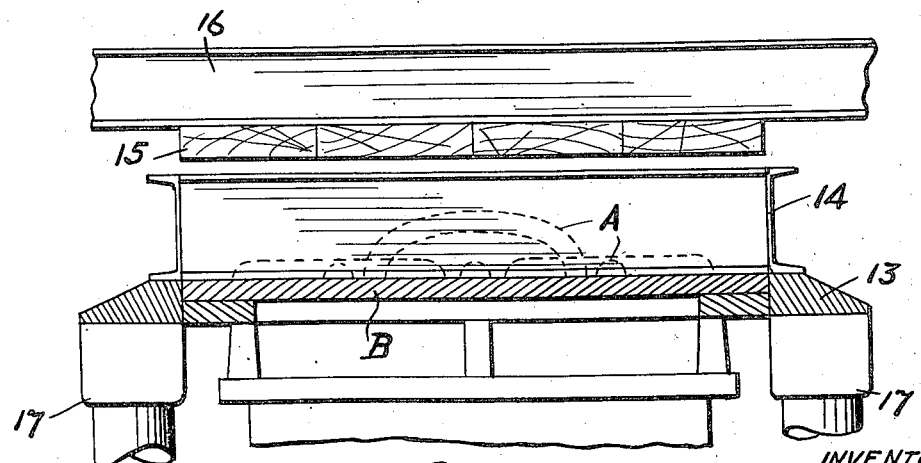
Figure 11:
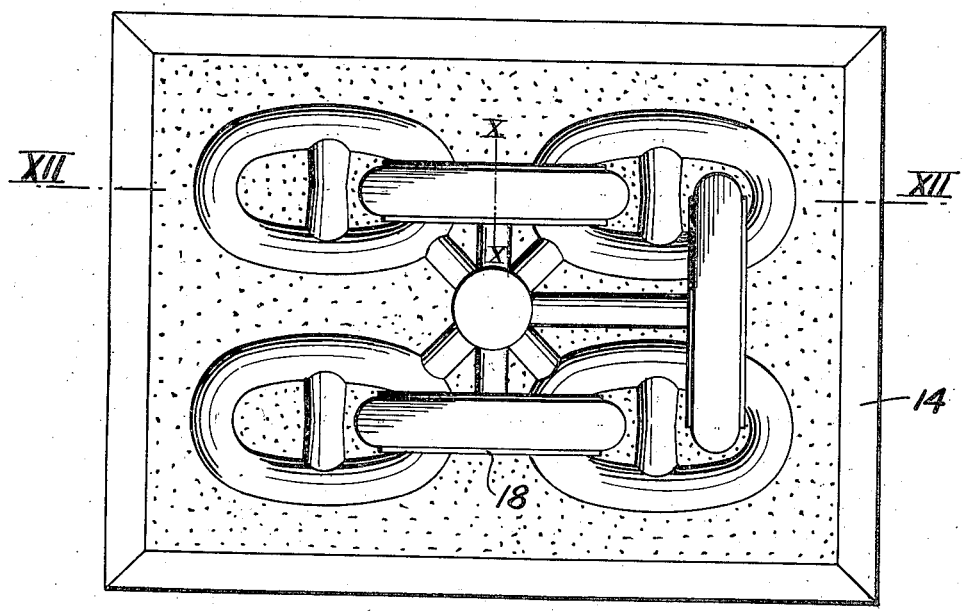
Figure 12:
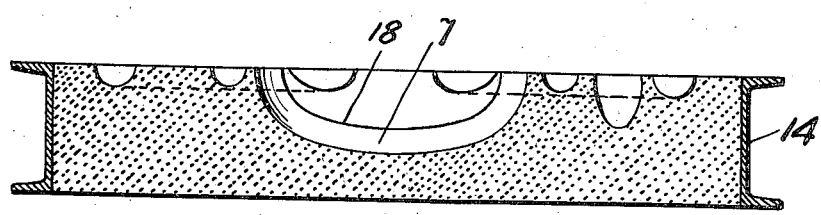

Figure 1 is a plan view of the pattern employed in making the halves of the mold; Fig. 2 is a diagrammatic side elevation and sectional view of a drag or lower half-mold in position in a conventional form of squeezer molding machine; Fig. 3 is a section through a completed mold taken on the line which would correspond to the line III—III of Fig. 1; Fig. 4 is a cross-sectional view through a mold corresponding to the line IV—IV of Fig. 1; Fig. 5 is a side elevation of Fig. 1; Figs. 6 and 7 are respectively a top plan view and side elevation of an improved detail of our invention; Fig. 8 is a sectional view through a portion of the cope and the drag showing the device of Figs. 6 and 7 in end elevation; Fig. 9 is a side elevation of another detail of our invention; Fig. 10 is a cross-sectional view taken on the line X—X of Fig. 11; Fig. 11 is a plan view of the drag half of a mold formed from the pattern illustrated in Fig. 1; and Fig. 12 is a section taken on the line XII—XII of Fig. 11.

The methods heretofore employed in the manufacture of chain may be roughly divided into two classes, a forging method and a molding method.

By the forging method the bars constituting the links are bent, passed through a link and the ends forged or welded together. Where, however, the chain to be forged is of the stud type, such as is employed in anchor chains, the cross-piece of stud is put in place between those portions of the bar forming the sides of the link and is forged, or the completed link may be formed, the stud inserted and the sides of the link pinched in. This process is so laborious that it takes substantially as long to build a suit of chain for a battleship as it takes to complete the ship. Furthermore, the inside of the weld is usually defective, particularly in the larger sizes of chain, as will be understood by those familiar with the art.

The forging method has been the one almost universally employed, for while it is expensive the resultant article is much superior to chains made according to the old molding methods now to be described.

Heretofore, in the old methods of molding chain, the chain had been produced by placing one or two already completed links in a permanent mold and then casting the connecting link in such mold; or by casting a connecting link about two previously formed links in a sand mold, the sand mold being made by hand; or by casting a plurality of connected links in a permanent mold usually made up of not less than four parts. The permanent molds, for reasons well understood in the foundry art, are unsatisfactory because of difficulties encountered in maintaining proper temperatures, preventing excessive chilling, and in the maintenance and repair of the complicated mechanism required. The old processes employing hand-made sand molds are laborious and expensive and require many different operations and false mold parts, and the product is not uniform. We are also aware that it has been heretofore attempted to cast links in sand molds made up of four-parts and corresponding in general theory of operation to the four-part permanent molds, but in so far as we are aware, none of these methods have been practised in the production of commercial chain.

We propose to overcome the difficulties encountered with the foregoing methods and to produce cast chains expeditiously and economically by means of a method whereby we are enabled to cast the chain in a sand mold, the parts of which can be rammed up by machine, such for example, as a split pattern machine or other form of squeezer or a jolt and pattern drawing machine, the latter being preferred. The halves of the mold according to our process may be made from a split pattern, a double-faced match plate, or a gated pattern, and the molds may be made of green sand, baked sand or may be skin-dried, one of the marked advantages of our process being that we are enabled to use green sand which greatly reduces time and labor costs and produces a superior article.

Referring now to the drawings, we have therein shown an apparatus of the split pattern type for carrying out our improved process. In this type of apparatus a half or split pattern designated as a whole by the reference numeral A is mounted on a suitable pattern plate or board B (Fig. 5), the pattern shown in the drawings being designed to form the mold cavities for seven links, the cavities for four of the links being formed in a horizontal plane and the cavities for the three connecting links being formed in a vertical plane, and all of the cavities being arranged about a central pouring sprue or hole. The half patterns for the horizontal links are denoted by the reference letters $a$, $b$, $c$, and $d$. The parts of the pattern forming the cavities for the vertical links are denoted by the reference letters $e$, $f$, and $g$. The pattern members $a$, $b$, $c$, and $d$ are true halves of the completed links (save of course where they join with the parts $e$, $f$, and $g$), and the pattern parts $e$, $f$, and $g$ are of such a construction as to leave a mold cavity such as indicated in Fig. 10 in cross-section, i. e., they form a cavity having a portion 7 which constitutes the cavity for the outside half of a connecting link and a portion 8 which is adapted to receive the mold member shown in Figs. 6, 7 and 8, as will hereinafter be more fully pointed out.

The pattern is also provided with members 9 adapted to provide a gate leading to each link and communicating with a central sprue-hole formed in part by the member 10 of the pattern. Each of the parts $a$ to $g$ inclusive may be provided with an upstanding block 11 adapted to form a riser opening in the mold to eliminate bubbles in the metal. Where it is intended to use the same split pattern to make both the cope and the drag molds, the riser blocks 11 are preferably made detachable as shown, because such riser cavities are only necessary in the cope half of the mold. In this connection it is also to be noted that the part 12 shown in Fig. 9 which is intended to complete the sprue in the cope half of the drag mold is arranged to be detachably mounted on the pattern part 10 so as to be detachable therefrom when forming the drag half of the mold. Where, of course, a separate split pattern is used for the cope and for the drag, the parts 11 and 12 may be made permanent with the other pattern parts.

The cavities for the studs connecting the sides of the links are formed in the horizontal links by the pattern parts $h$. The pattern parts $e$, $f$, and $g$ for the connecting links must of course be plane so as to permit of the drawing of the pattern so that the provision of studs for the connecting links is accomplished by means hereinafter to be pointed out.

The making of a half mold from the pattern just described will now be set forth, attention being directed particularly to Fig. 2, in which the drag half of the mold is shown. The pattern board B is therein illustrated as being in position on the ramming head of a jolt split pattern machine with the pattern A in place. Surrounding the pattern plate B and carried on the frame 13 of the split pattern machine is the flask 14 which of course is filled with sand in the usual manner, after which the ramming head and the frame 13 are jolted and then raised so as to cause the sand to be further compressed by the platen 15 carried on the ramming yoke 16 of the machine. After the sand has thus been compressed or compacted within the flask the parts are lowered away from the platen 15 and thereafter the pattern is drawn from the mold by elevating the frame 13 through the medium of the cylinder and plunger mechanism 17. The parts of the jolt-split pattern machine referred to are conventional and are well understood in this art, so detailed description and illustration thereof is unnecessary, it being understood that the machine operates in the usual manner.

The drag half of the mold thus formed will have an imprint in the sand of the pattern shown in Fig. 1 with the parts 11 and 12 removed as heretofore pointed out. The mold cavities are shown in plan view in Fig. 11; and Fig. 12 is a section taken on the line XII—XII of Fig. 11. From an inspection of these figures and Figs. 8 and 10 it will be noted that the parts $e$, $f$, and $g$ form cavities, the inner parts 7 of which constitute the cavity for the outside half of a half link, the portion 8 of the cavity being straight and of greater width than the portion 7 so as to leave shoulders or core prints 18.

The cope half of the mold is similarly formed, but in this instance the pattern should be provided with the parts 11° and 12 so as to form the riser-holes and sprue-hole. To complete the mold certain mold parts in the nature of cores, now to be described, are inserted to partly fill the cavities left by the pattern parts *e*, *f*, and *g*, such parts being so formed as to provide a cavity for the inner half of the connecting links, matching up with the cavities 7 and shoulders 18 so as to provide a complete cavity corresponding to the shape of the connecting link, but separated from the cavities for the horizontal links by a partition or wall of sand.

The mold parts C referred to may be called cores, but they are not used in the same sense and for the same purpose that cores are ordinarily used. They are preferably composed of the same material from which cores are made. Each core C, for the making of the round end type of link shown must be split into two halves so that the core in which they are made may be drawn. Formed in the periphery of each core is a rounded cavity 19, the edges of the core being as it were flanged at 20. Intermediate its ends the core is provided with a transverse stud-forming cavity 21 opening at both ends into the cavity 19. A lateral opening 22 communicates with the opening 21. Through the body of the core on each side of the opening 21, an opening or cavity 23 is formed, there being a wall of sand 24 remaining between the annular cavity 19 and the cavities 23.

Both halves of the core are preferably inserted in the cavities in the drag half of the mold formed by the pattern parts *e*, *f*, and *g* in the manner indicated in dotted lines in Fig. 10, after which the cope half of the mold is placed in position, when the parts will be in the position indicated in Fig. 8. When all of the parts of the mold are thus assembled, it will be seen that the openings 22 in the cores aline with the gate cavities formed by the pattern parts 9, leading to the pattern parts *e*, *f* and *g*, and that the flanges 20 of the core will fit the core prints or shoulders 18. The cores C therefore fit into the spaces formed by the pattern parts *e*, *f*, and *g*, but leave a cavity of the shape of the connecting link, the outer half of which cavity is formed by the opening 7 and the inner half of which is formed by the opening or cavity 19 in the core. The cavity for the connecting link is separated from the adjacent cavities for the links to be connected by the wall portions 24 of the core. The cavities 23 aline with the cavities formed by the horizontal pattern parts *a*, *b*, *c* and *d* and complete the ends of the mold cavities for the horizontal links. The mold is poured through the sprue formed by the block 12, the metal finding its way to the link cavities through the gate cavities formed by the pattern parts 9. The metal enters the cavities for the vertical links from the gate cavities through the openings 22 and the cavities 21.

The foregoing will be better understood from Figs. 3 and 4 which respectively are longitudinal and cross-sections through a completed mold showing the cores in position.

Another reason for splitting the core members C is that if desired we may place in the cavities formed by the pattern parts *a*, *b*, *c*, and *d*, links already cast and cast the connecting links thereabout. If this be done one-half of the core would be placed in each connecting link cavity in the drag, then the cast links would be placed in the cavities formed by the pattern parts *a*, *b*, *c*, and *d*, then the other halves of the cores would be placed in position over the links, and after this the cope half of the mold would be positioned.

The sections of chain thus produced are joined by inserting the last links in end mold cavities.

It will also be noted that we have carried the parts 11 up to the level of the block 12, that is to say, the riser openings formed by the parts 11 extend through the cope half of the mold this for the reason that it may be desired to pour each link separately, instead of pouring all of the links from a common sprue. Where all of the links are poured from one or more sprues, it is highly advantageous that the gates be so located and arranged as to cause the metal to reach the mold cavities at substantially the same time. In the drawings this is accomplished by the relative central location of the sprue and by the different sizes of the gate forming pattern parts 9.

It will be seen from the foregoing description of the apparatus employed that we have provided a simple method whereby chain can be cast (even from cast steel, a most difficult metal to pour) economically and expeditiously from a sand mold, the parts of which, whether halves or otherwise, may be formed with one ramming on conventional molding machinery. By one ramming is meant that no false mold parts, copes or drags or cheeks, are utilized, a result not heretofore obtained in sand molding of chain. Our improved process may, therefore, be carried out either by hand or by machine in any foundry equipped with molding machines, and this without the necessity of installing any additional machinery and without necessitating any change in standard foundry methods, such as are involved in the use of the complicated machinery and the delicate methods of permanent mold casting. Our improved process, therefore, has all of the advantages of permanent molding but without any of the disadvantages incident thereto, and by it we are able to produce a uniform chain of the required strength at a much smaller cost than is incurred in the forging process.

Other advantages incident to our process and apparatus will be readily understood by those familiar with the art. If carried out by hand, our process is more expeditious and productive of uniform results than the old hand methods, such as shown for example in U. S. patent to McGlashan and Williams, #1,050,370, in which false mold parts are used.

It is to be understood that we have illustrated but one form of apparatus whereby our invention may be carried out and our invention therefore is not limited to the precise mechanism shown, but departures may be made therefrom within the spirit of our invention as defined in the appended claims.

We claim:

1. The step in the process of making cast chain from a two-part sand mold, the halves of which are to be brought face to face to form the completed mold, which consists in forming the cavity for the outside half of a connecting link unit in each half-mold from a half-pattern, and in inserting in said cavity a core having a cavity forming the inside half of the connecting link unit and serving to separate the cavity for the connecting link unit from other units, in bringing the half-molds together and in pouring said connecting link unit.

2. The herein-described process of making cast chain from a two-part sand mold, the halves of which are to be brought face to face to form the completed mold, which consists in forming in each half mold the cavity for a link unit and a cavity merging therewith from a half-pattern, in inserting in said last cavity a mold part which completes the cavity for the said link unit and provided with a cavity of a link unit surrounding but not intersecting the cavity for the first link unit, in bringing the halves of the mold together, and in pouring the mold.

3. The herein-described process of making cast chain from a two-part sand mold, the halves of which are to be brought face to face to form the completed mold, which consists in forming in each half-mold merging cavities for a plurality of link units and a connecting link unit from a half-pattern, in inserting a mold part which has cavities corresponding to and completing the cavities for the plurality of links and a cavity completing the cavity for the connecting link unit, such cavities in the sand mold part being separated, in bringing the halves of the mold together, and in pouring the mold.

4. The herein-described process of making cast chain which consists in forming in the parts of a sand mold a plurality of link cavities surrounding but not intersecting one another and arranged about a central locus for pouring with a gate cavity leading from each link cavity to said central locus, in bringing the parts of the mold together, and in pouring the mold.

5. The herein-described process of making cast steel chain which consists in ramming two complementary green sand half-molds with a plurality of link-forming cavities in the meeting faces thereof, in inserting a core completing said cavities and having a link-forming cavity, said link-forming cavities surrounding but not intersecting each other, in bringing the halves of the mold together and in pouring the mold without baking the sand.

6. The herein-described process of making cast chain which consists in forming sand half-molds with one ramming from a pattern with cavities in the meeting faces thereof, in inserting in said cavities core parts having link-forming cavities surrounding but not intersecting each other, in bringing the halves of the mold together, and in pouring the mold.

7. The herein-described process of making cast chain which consists in forming in flasks a sand mold having an upper and lower part with a plurality of merging cavities therein, in inserting a core having a link-forming cavity and completing the mold cavity to form non-intersecting link cavities, in bringing the halves of the mold together, and in pouring the mold.

8. The herein-described process of making cast chain which consists in forming in flasks a sand mold having an upper and lower part with a plurality of merging cavities therein, in inserting a core having a link-forming cavity and completing the mold cavity to form non-intersecting link cavities, in bringing the halves of the mold together and in pouring the mold through the upper portion thereof.

9. The herein-described process of making cast stud chain which consists in forming from a pattern in the halves of two sand molds which are to be brought face to face to form a completed mold, the cavity for a stud chain with a cavity merging therewith but terminating short of the stud portion of the first cavity, in inserting in said second cavity a core part having a cavity for a connecting link and a cavity completing the cavity for the first link.

In testimony whereof we have hereunto signed our names.

THOMAS J. MUMFORD, 2D.
HOWARD W. SINCLAIR.